United States Patent [19]

Riemscheid et al.

[11] Patent Number: 5,055,096
[45] Date of Patent: Oct. 8, 1991

[54] DIFFERENTIAL GEARING

[75] Inventors: Helmut Riemscheid; Herbert Frielingsdorf, both of Lohmer; Klaus Greulich, Swistal-Heimerzheim; Peter Amborn, Neunkirchen-Seelscheid, all of Fed. Rep. of Germany

[73] Assignee: GKN Automotive AG, Siegburg, Fed. Rep. of Germany

[21] Appl. No.: 543,149

[22] Filed: Jun. 25, 1990

[30] Foreign Application Priority Data

Jun. 24, 1989 [DE] Fed. Rep. of Germany ....... 3920794

[51] Int. Cl.$^5$ .............................................. F16H 37/08
[52] U.S. Cl. ...................................... 475/249; 475/252
[58] Field of Search ................... 475/249, 252

[56] References Cited

U.S. PATENT DOCUMENTS

| | | | |
|---|---|---|---|
| 1,407,703 | 2/1977 | Moir | 475/249 X |
| 3,292,456 | 12/1966 | Saari | 475/249 X |
| 3,406,593 | 10/1968 | Vesey | 475/252 X |
| 3,412,632 | 11/1968 | McFiggans | 475/252 X |

Primary Examiner—Dirk Wright
Attorney, Agent, or Firm—Toren, McGeady & Associates

[57] ABSTRACT

A differential gearing comprises a carrier (1); output gears (3, 11); and differential gears (4, 5) in two sets meshing respectively with the output gears and directly or indirectly with one another. The differential gears are disposed asymmetrically about the carrier so that a resultant radial force acts on the output gears urging them into engagement with recesses in the carrier (1) or a support member (7) therein, so that the frictional inhibition of the differential action is increased.

17 Claims, 4 Drawing Sheets

DIFFERENTIAL GEARING

BACKGROUND TO THE INVENTION

1. Field of the Invention

This invention relates to a self-inhibiting differential gearing comprising a carrier; two output gears disposed substantially co-axially in the carrier; a first set of differential gears engaging one of the output gears; and a second set of differential gears engaging the other output gear, the two sets of differential gears engaging one another at least indirectly (i.e. indirectly or directly). Such a differential gearing will hereinafter be referred to as a differential gearing of the kind specified. In a differential gearing of the kind specified, a frictional self-inhibition of differential rotation of the output gears is produced as a result of forces acting between the output and differential gears producing friction at supporting surfaces of the differential gears.

2. Description of Prior Art

An example of a differential gearing of the kind specified, wherein the differential gears are disposed in axis-parallel relation to the output gears in intersecting recesses in the differential carrier, is disclosed in DE-PS-2206107. The self-inhibition of differential rotation of the output gears is achieved primarily due to friction of the differential gears in their recesses, which occurs as a result of reaction forces as the differential gears attempt to displace themselves in consequence of the tooth forces at their points of engagement with the output gears. The output gears themselves are substantially balanced with respect to such forces, as a result of the symmetrical arrangement of the differential gears circumferentially around the carrier.

Another example of differential gearing of the kind specified is disclosed in WO89/03943, wherein helically toothed worm differential gears engage one another by external straight-toothed portions. Another arrangement is disclosed in WO87/00900, wherein differential gears engage through an intermediate gear with transverse rotational axis. In these examples, the loads on the output gears are balanced.

SUMMARY OF THE INVENTION

It is broadly the object of the present invention to provide a differential gearing of the kind specified which, while retaining generally the same overall design of such differentials as known previously, provides a considerable increase in the effect of self-inhibition of differential rotation of the output gears.

According to the present invention, we provide a differential gearing of the kind specified wherein the differential gears are circumferentially disposed asymmetrically around the carrier, and the output gears are disposed in recesses in the carrier such that relative radial displacement is possible between the output gears and recesses to produce frictional forces therebetween.

In a differential gearing according to the invention, the tooth forces of the differential gears are not balanced, so that the output gears are radially displaced to cause frictional forces to occur at friction faces of the output gears. This is in addition to the frictional forces generated at the differential gears in known manner. Thus the increased self-inhibition of differential rotation of the output gears is obtained.

Preferably the differential gears are disposed substantially all in one half of the circumference of the carrier. This achieves the maximum unbalance of the forces acting on the output gears.

There are several alternative ways in which the output gears may be supported in the carrier in order to provide a frictional resistance to their rotation when the forces acting thereon displace them radially. In a first possibility, the output gears may have their toothed portions directly supported in cylindrical recesses in the differential carrier.

A further possibility is that the toothed portions of the output gears may have clearance from the recesses wherein they are accommodated, while journal portions at the ends of the toothed portions are slidably supported in the recesses in the differential carrier.

In a third possibility, the output gears may be provided with obtuse angled frusto-conical surfaces at the ends of their toothed parts, supported by complementary frusto-conical surfaces in the differential carrier. This achieves a particularly high resistance to rotation of the output gears when they are radially displaced. If such conical surfaces are not symmetrically arranged, there is additionally produced an axial thrust on the output gear which may generate additional friction at the opposite axial end face of the output gear.

Basically the same possibilities as those above set forth in relation to the output gears exist for the manner in which the differential gears are supported in the carrier. An additional possibility is that the differential gears may be in the form of hollow sleeves, slidingly supported on journals held in the differential carrier.

Bushes of suitable material may be provided in the differential carrier, for engagement by the toothed or other surfaces of the differential gears and/or output gears. Such bushes will be provided with longitudinal slots in the region where they are engaged by teeth of the gears. Discs of suitable material may be provided at the faces of the differential gears and/or the output gears, particularly if helical teeth, pressure springs, or other expedients are adopted to cause additional frictional forces to be generated at end faces of the gears.

As output shafts connected to the output gears are usually supported in the differential, radial movement of the output gears is possible only if support means for the output shafts are arranged at an appreciable distance from the output gears. If this is not the case, it is proposed that the differential carrier may comprise a support means for the differential gears and having said recesses for the output gears, the support means being displaceable in the differential carrier in the direction of the resultant of the gear forces determined by the asymmetrical arrangement of the differential gears. When torque is being transmitted, additional frictional forces arise between the output gears and the support means, even if the position of the output gears remains unchanged in the carrier; the support means is radially displaced to provide the relative displacement between the output gears and their recesses. In one particular embodiment, there may be provided radial guiding means operative between the differential carrier and the support means, the guiding means extending in the direction of the resultant force.

In order to rotationally balance the differential gearing as a whole, and compensate for the asymmetric distribution of the differential gears in the carrier, it is advantageous to provide bores, recesses or openings in the half of the carrier opposite that in which the differential gears are disposed. Alternatively, balancing weights may be provided on the half of the carrier which contains the differential gears. The volume of whichever expedient is used for balancing the differential carrier should approximately correspond to the volume of the spaces between the differential gears and the recesses in the carrier wherein they are disposed.

As a result of the increase in frictional forces obtained in a differential according to the invention, as above described, it is in many cases possible to achieve sufficient self-inhibition of differential action if the differential gears have simple spur teeth, either straight or helical. Previously, with the same size of the parts, it was necessary to use worm gear teeth to increase friction. If helical teeth are used, additional frictional forces may be generated at the ends of the gears.

The differential gears, each engaging an output gear, should engage each other at least in pairs; thus they may engage each other in groups of three or more.

The differential gears are not necessarily all the same size as one another; for reasons of space it may be advantageous to design them with different diameters. If unequal torque distribution between the output gears is required, the output gears may be of different sizes from one another.

BRIEF DESCRIPTION OF DRAWINGS

The invention will now be described by way of example with reference to the accompanying drawings, wherein.

DESCRIPTION OF PREFERRED EMBODIMENTS

Figure 1A:
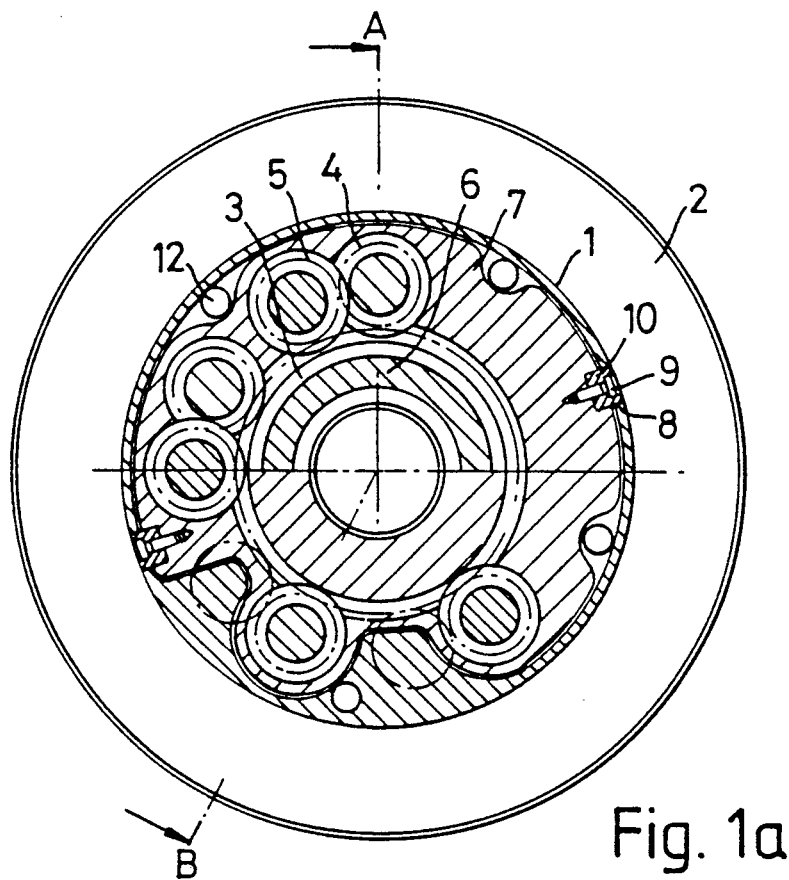
FIG. 1A is a cross-section of one embodiment of differential according to the invention, on the line C-D of FIG. 1B.
Figure 1B:
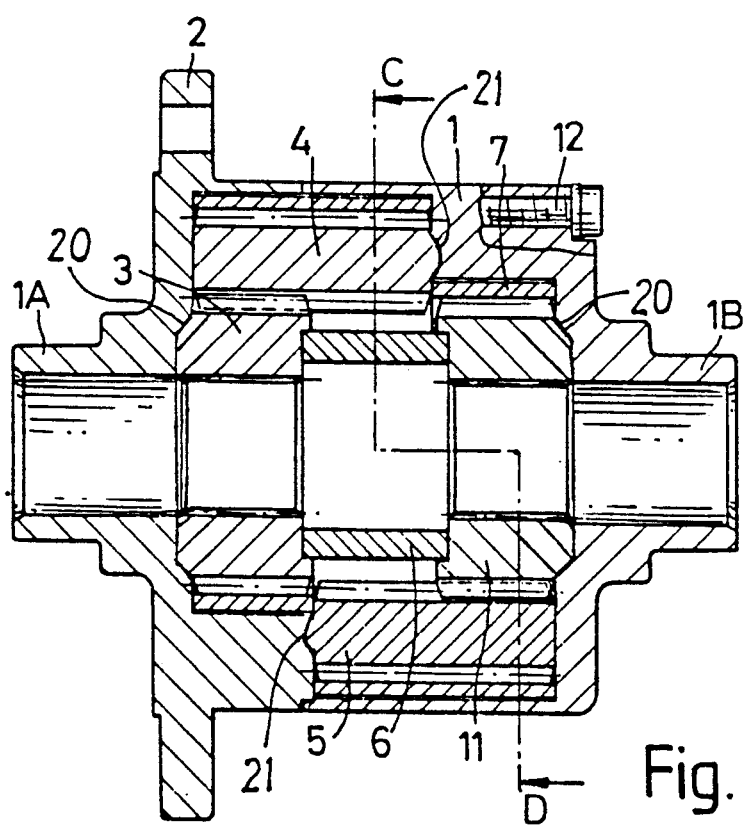
FIG. 1B is a longitudinal section of the differential, on the line A-B of FIG. 1A.

Referring firstly to FIGS. 1A and 1B of the drawings, there is shown a differential which comprises a carrier 1 which has a flange 2 for bolted attachment of a driving gear. The carrier is in the form of a two-part hollow member, the two parts being joined by bolts as indicated at 12, and having respective spigots 1A, 1B whereon would be received bearings for rotatably supporting the carrier in, e.g. the axle casing of a motor vehicle.

A support member 7 is held within the carrier 1. The support member 7 is displaceable radially by a small distance within the carrier. It is guided for radial displacement by oppositely disposed guide members 10, connected to the support member 7 by bolts g and engaging slots or apertures 8 in the carrier 1.

Within respective recesses in the support member are disposed two output gears 3, 11 which are supported axially relative to one another by an intermediate sleeve 6. The recesses in the support member allow small radial displacement of the output gears relative to the support member. The output gears have splined bores for torque transmitting connection to output shafts, e.g. half shafts, extending axially outwardly from the carrier through the hollow spigots of the carrier parts. First and second sets of differential gears 4, 5 are disposed within recesses in the support member, the gears 4 meshing with the output gear 3 and the gears 5 meshing with the output gear 11. The two sets of differential gears mesh with one another in pairs, i.e. each differential gear 4 meshes with one of the differential gears 5.

The differential gears 4, 5 are asymmetrically disposed around the circumference of the carrier. It will be clearly seen from FIG. 1A that all the differential gears are disposed in a little over half the circumference of the carrier. Thus when torque is being transmitted, the resultant of the radial forces acting between the differential gears and output gears is a radial force on the support member 7. The direction in which the support member 7 is radially displaceable within the carrier is in the direction of this resultant force. Such displacement of the support member with the differential gears therein presses the support member 7 against the output gears, thus increasing the frictional inhibition of the action of the differential.

The output gears 3, 11 can have obtuse angled frusto-conical surfaces 20 at the ends of their tooth portions, which surfaces 20 are supported by complementary frusto-conical surfaces in the differential carrier. The differential gears 4, 5 can also have obtuse angled frusto-conical surfaces 21 at the ends of their toothed portions, which surfaces 21 are supported by complementary frusto-conical surfaces in the differential carrier.

Figure 2A:
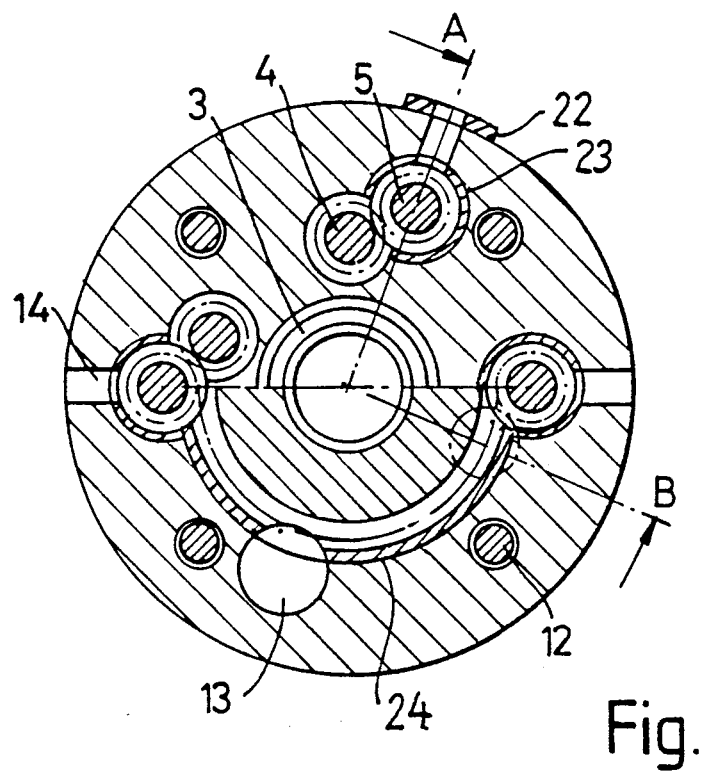
FIG. 2A is a transverse cross-section of another embodiment of differential according to the invention, on the line C-D of FIG. 2B.
Figure 2B:
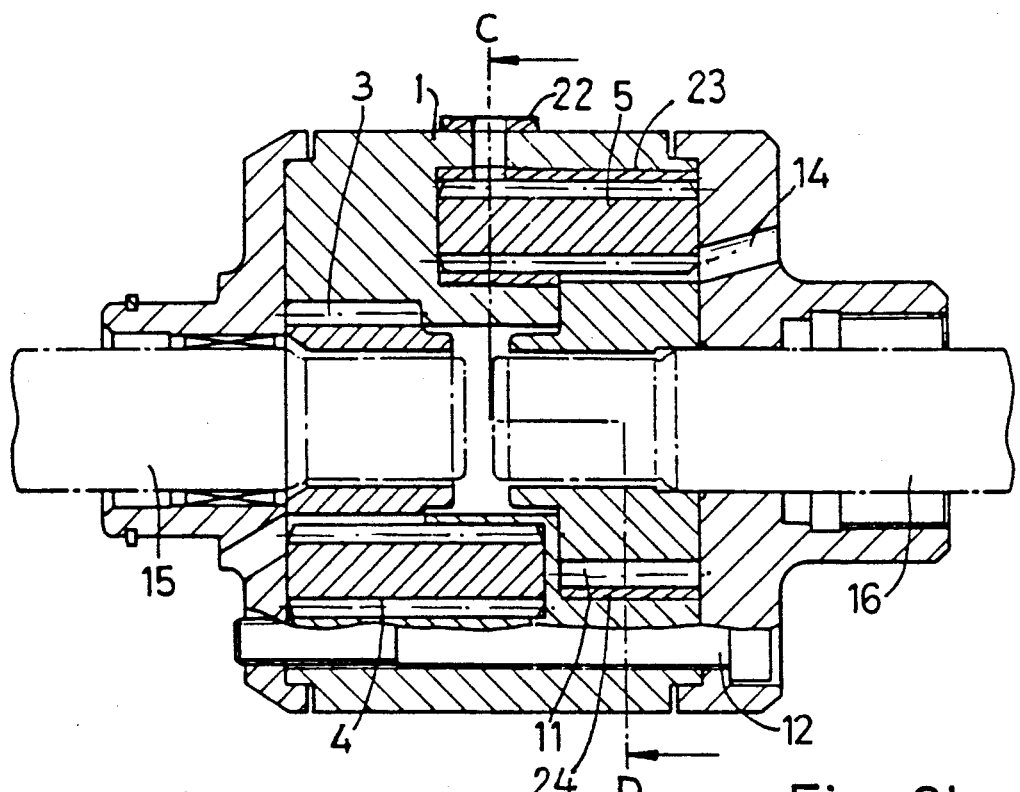
FIG. 2B is a longitudinal section through the differential of FIG. 2A on the line A-B thereof.

Referring now to FIGS. 2A and 2B, these show a differential wherein parts corresponding to those of FIGS. 1A and 1B are accorded the same reference numerals.

The differential shown in FIG. 2A and 2B again has a carrier 1 which in this embodiment is of three part construction, with two end parts and a centre part. These parts are held together by circumferentially spaced through bolts 12. The output gears 3, 11 are shown disposed in respective recesses at opposite axial ends of the central part of the carrier: the output gears are of different sizes from one another to provide unequal torque distribution therebetween.

Three pairs of differential gears 4, 5 are also disposed in respective recesses in the central part of the carrier; the differential gears 4 mesh with the output gear 3 and the differential gears 5 mesh with the output gear 11 All the differential gears are disposed in a little over half the circumference of the carrier. To balance the differential, a bore 13 is visible in FIG. 2A, in the opposite part of the circumference of the carrier. Balancing weights 22 can also be attached to the carrier.

Also visible in the drawings are half shafts 15, 16 connected to the output gears, and lubricant passageways 14 leading to the differential gears. In this embodiment when torque is being transmitted between the output gears both the output gears and differential gears are pressed radially against the surfaces of the recesses in the carrier wherein they are disposed, as a result of the forces acting between the teeth of the gears. Limited radial displacement of the output gears within their recesses in the carrier is possible by virtue of the axial distance of the output gears from the bearings supporting the half shafts in the carrier.

Figure 3:
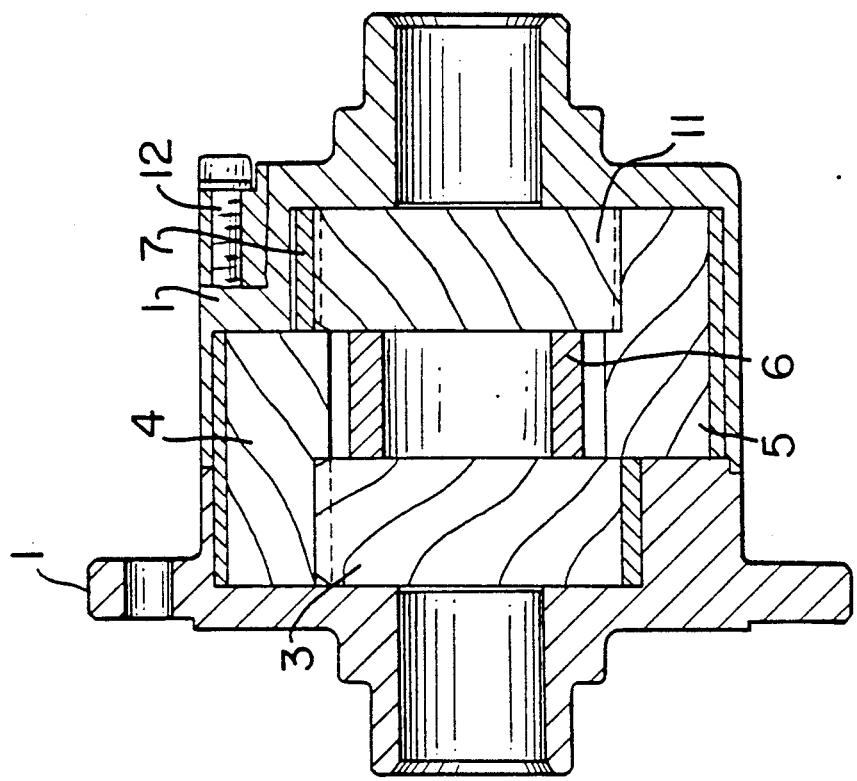
FIG. 3 is a view similar to FIG. 1B, of a further embodiment of the differential.

In the embodiment above described, the output gears and the differential gears may be straight-toothed spur gears, or may be helically toothed as shown in FIG. 3.

Figure 4B:
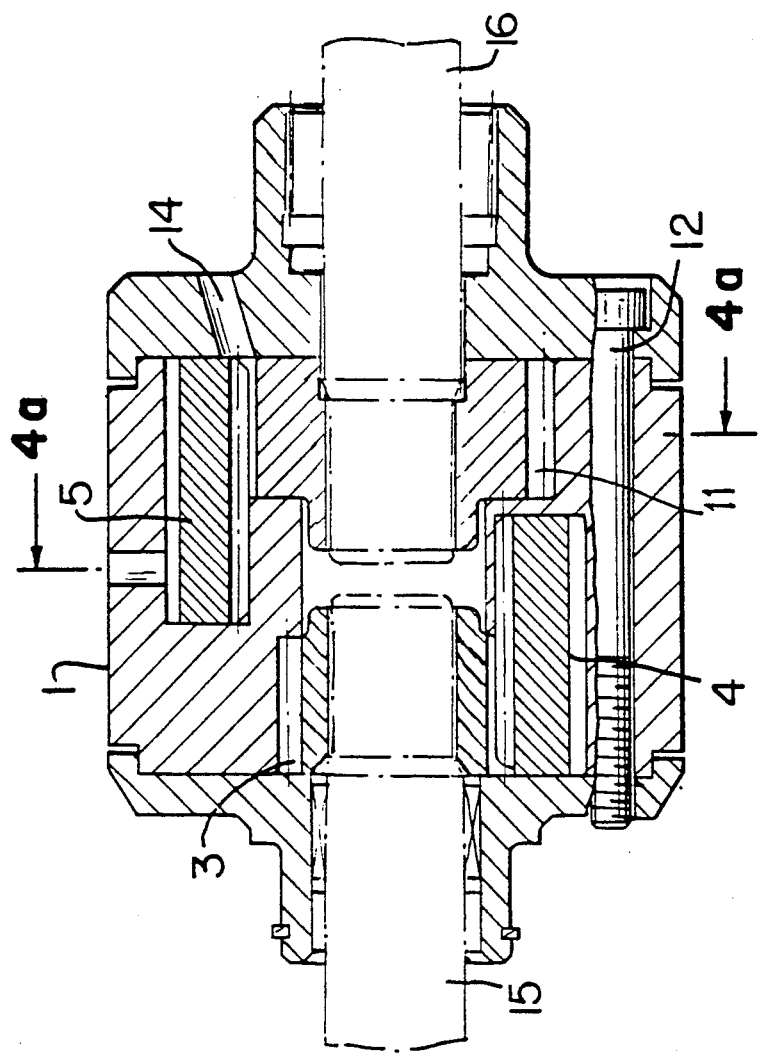
FIG. 4B is a longitudinal section through the differential of FIG. 4A on the line 4b-4b thereof.
Figure 4A:
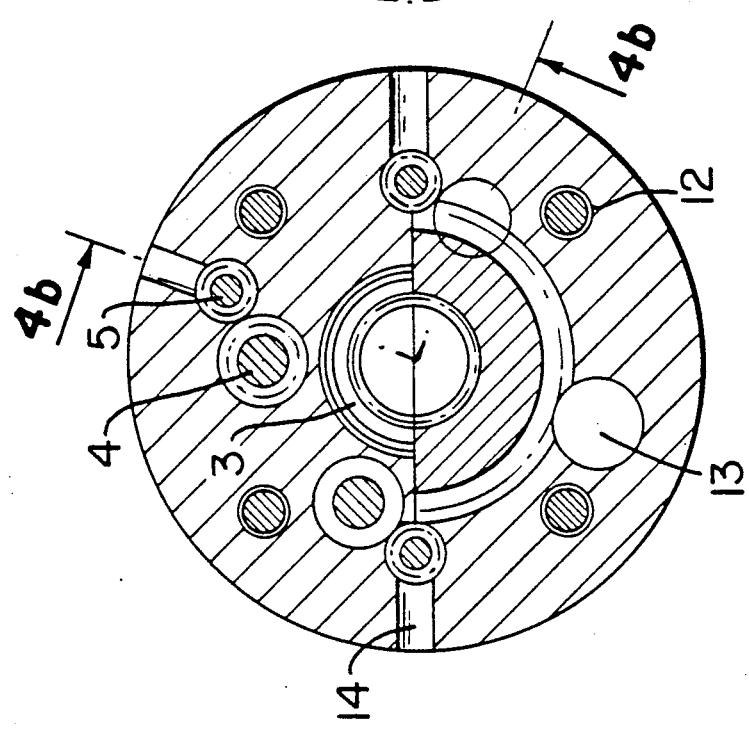
FIG. 4A is a transverse cross-section of yet another embodiment of a differential according to the invention, on the line 4a-4a of FIG. 4B.

In the latter case, transmission of torque produces axial forces in the gears, in which case additional friction may be generated where the end faces of the gears abut the carrier. Inserts, 23,24 e.g. discs, of suitable friction material may be provided at such end faces, as they may be provided in the form of longitudinally slotted bushes to cooperate with the peripheral teeth of the gears. Also, is illustrated in FIGS. 4A and 4B, the differential gears 4 of one set can have a different diameter than the differential gears 5 of the other set.

Further, the principle according to the invention, of disposing the differential gears asymmetrically in the carrier, is applicable to differential gearing units wherein different types of differential and output gears are used. As an example, the invention is applicable to the type of differential disclosed in WO89/03943, wherein worm output gears engage differential gears with helically toothed portions at the ends of which are straight-toothed portions, the straight-toothed portions of the differential gears engaging one another. Another example of the type of differential unit to which the invention is applicable is that disclosed in WO87/00900, wherein differential gears engage one another through an intermediate gear with a transverse rotational axis.

We claim:

1. A self-inhibiting differential gearing comprising a carrier; two output gears disposed substantially co-axially in the carrier; a first set of differential gears engaging one of the output gears; and a second set of differential gears engaging the other output gear, the two sets of differential gears engaging one another at least indirectly; wherein the differential gears are circumferentially disposed asymmetrically around the carrier, and the output gears are disposed in recesses in the carrier such that relative radial displacement is possible between the output gears and recesses to produce frictional forces therebetween.

2. A differential gearing according to claim 1 wherein the differential gears are disposed substantially all in one half of the circumference of the carrier.

3. A differential gearing according to claim 1 wherein the output gears have toothed portions directly supported in the recesses in the differential carrier.

4. A differential gearing according to claim 1 wherein the output gears have toothed portions with a clearance from the recesses wherein they are accommodated, and journal portions at the end of the toothed portions slidably supported in the recesses in the differential carrier.

5. A differential gearing according to claim 1 wherein the output gears have obtuse angled frusto-conical surfaces at the ends of their toothed portions, supported by complementary frusto-conical surfaces in the differential carrier.

6. A differential gearing according to claim 1 wherein the differential gears have toothed portions directly supported in the recesses in the differential carrier.

7. A differential gearing according to claim 1 wherein the differential gears have toothed portions with a clearance from the recesses wherein they are accommodated, and journal portions at the end of the toothed portions slidably supported in the recesses in the differential carrier.

8. A differential gearing according to claim 1 wherein the differential gears have toothed portions with obtuse angled frusto-conical surfaces at the ends thereof, supported by complementary frusto-conical surfaces in the differential carrier.

9. A differential gearing according to claim 1 wherein the output gears and differential gears have parallel axes and are helically toothed.

10. A differential gearing according to claim 1 wherein the output gears and differential gears have parallel axes and are straight-toothed spur gears.

11. A differential gearing according to claim 1 wherein the carrier comprises recesses for rotational balancing.

12. A differential gearing according to claim 1 wherein balancing weights are provided on or secured to the carrier.

13. A differential gearing according to claim 1 wherein the carrier comprises a support means for the differential gears and having said recesses for the output gears, the support means being displaceable in the differential carrier in the direction of the resultant of the gear forces determined by the asymmetrical arrangement of the differential gears.

14. A differential gearing according to claim 13 wherein guiding means operative between the differential carrier and the support means is provided for guiding the latter radially in the carrier in the direction of the resultant force.

15. A differential gearing according to claim 1 comprising inserts of friction material in the recesses for engagement by the differential gears and/or output gears.

16. A differential gearing according to claim 1 wherein the differential gears of the first set thereof are of a different diameter from the differential gears of the second set.

17. A differential gearing according to claim 1 wherein the output gears are of different diameter from one another.

* * * * *